(12) United States Patent
Tsukamoto et al.

(10) Patent No.: US 11,004,626 B2
(45) Date of Patent: May 11, 2021

(54) POWER SUPPLY CONTROL DEVICE, POWER SUPPLY CONTROL METHOD, AND COMPUTER PROGRAM

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Katsuma Tsukamoto, Mie (JP); Kota Oda, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 362 days.

(21) Appl. No.: 16/303,972

(22) PCT Filed: May 16, 2017

(86) PCT No.: PCT/JP2017/018363
§ 371 (c)(1),
(2) Date: Nov. 21, 2018

(87) PCT Pub. No.: WO2017/204038
PCT Pub. Date: Nov. 30, 2017

(65) Prior Publication Data
US 2020/0402738 A1 Dec. 24, 2020

(30) Foreign Application Priority Data
May 26, 2016 (JP) .............................. JP2016-105476

(51) Int. Cl.
*H01H 9/52* (2006.01)
*H01H 33/53* (2006.01)
(Continued)

(52) U.S. Cl.
CPC .......... *H01H 9/542* (2013.01); *H01H 33/596* (2013.01); *H01H 47/002* (2013.01); *H02M 1/32* (2013.01); *H01H 2047/025* (2013.01)

(58) Field of Classification Search
CPC ...... H01H 9/542; H01H 9/541; H01H 33/596; H01H 33/04; H01H 2047/025
See application file for complete search history.

(56) References Cited

U.S. PATENT DOCUMENTS

| 5,898,557 A * | 4/1999 | Baba .................. H03K 17/0822 361/100 |
| 10,119,513 B2 * | 11/2018 | Tahara ....................... H02J 7/14 |

(Continued)

FOREIGN PATENT DOCUMENTS

| JP | S61049335 A | 3/1986 |
| JP | H11213830 A | 8/1999 |

(Continued)

OTHER PUBLICATIONS

International Search Report, Application No. PCT/JP2017/018363 dated Aug. 22, 2017.

*Primary Examiner* — Thienvu V Tran
*Assistant Examiner* — Sisay G Tiku
(74) *Attorney, Agent, or Firm* — Honigman LLP (57) ABSTRACT

With a power supply control device, if semiconductor switches of a switch circuit are on and a relay contact is off, a controller determines whether or not a switch electric current detected by an electric current sensor is at least a threshold. If the controller has determined that the switch electric current is at least the threshold, then an electric current supply unit switches on the relay contact, and a drive circuit switches off the semiconductor switches. The controller changes the above-described threshold in accordance (Continued)

with the length of the lapse of time from when an electric current flows through the switch circuit.

6 Claims, 8 Drawing Sheets

(51) Int. Cl.
  *H01H 33/04*  (2006.01)
  *H01H 9/54*  (2006.01)
  *H01H 33/59*  (2006.01)
  *H01H 47/00*  (2006.01)
  *H02M 1/32*  (2007.01)
  *H01H 47/02*  (2006.01)

(56) References Cited

U.S. PATENT DOCUMENTS

| | | | |
|---|---|---|---|
| 10,804,733 B2 * | 10/2020 | Koike | H02J 7/14 |
| 2003/0193770 A1 | 10/2003 | Chung | |
| 2013/0320986 A1 * | 12/2013 | Shiraishi | G01R 31/327 |
| | | | 324/415 |
| 2014/0015534 A1 * | 1/2014 | Katayama | H02J 7/007 |
| | | | 324/430 |
| 2018/0041022 A1 * | 2/2018 | Fukui | H02H 3/087 |
| 2019/0252908 A1 * | 8/2019 | Takita | H02J 7/1423 |
| 2019/0356161 A1 * | 11/2019 | Wakazono | H03K 17/122 |
| 2019/0363200 A1 * | 11/2019 | Hoft | H02S 40/36 |

FOREIGN PATENT DOCUMENTS

| | | | |
|---|---|---|---|
| JP | 5669086 B2 | 2/2015 | |
| WO | 2011052606 A1 | 5/2011 | |

\* cited by examiner

| State flag value | Switch state |
|---|---|
| Zero | Semiconductor switch: OFF<br>Relay contact: OFF |
| 1 | Semiconductor switch: ON<br>Relay contact: OFF |
| 2 | Semiconductor switch: OFF<br>Relay contact: ON |

| Threshold Ith | Keeping period Ps |
|---|---|
| First electric current I1 | First period P1 |
| Second electric current I2 | Second period P2 |
| Third electric current I3 | Third period P3 |
| Fourth electric current I4 | Fourth period P4 |

FIG. 10

POWER SUPPLY CONTROL DEVICE, POWER SUPPLY CONTROL METHOD, AND COMPUTER PROGRAM

CROSS-REFERENCE TO RELATED APPLICATIONS

This application is the U.S. national stage of PCT/JP2017/018363 filed May 16, 2017, which claims priority of Japanese Patent Application No. JP 2016-105476 filed May 26, 2016.

TECHNICAL FIELD

The present disclosure relates to a power supply control device, a power supply control method, and a computer program.

BACKGROUND

Japanese Patent 5669086 discloses a power supply control device configured to control the supply of power from a power source to a load by switching on and off a switch provided on a power supply path through which power is supplied from the power source to the load. In this power supply control device, a parallel circuit, including a semiconductor switch and a relay contact, is provided on the power supply path through which power is supplied from the power source to the load. If the supply of power to a load is started, the semiconductor switch is switched on, and then the relay contact is switched on. Thereafter, the semiconductor switch is switched off. If the supply of power to a load is ended, the semiconductor switch is switched on, and then the relay contact is switched off. Thereafter, the semiconductor switch is switched off.

A semiconductor switch has an ON-resistance. Thus, if an electric current flows through the semiconductor switch, the ON-resistance generates heat, and the temperature of the semiconductor switch increases. Also, because the semiconductor switch is electrically switched on and off, there is no limitation on the number of times of switching on and off the semiconductor switch.

A relay contact includes a NO (Normally Open) terminal, a COM (Common) terminal, and a rod-shaped conductor whose end portion is connected to the COM terminal. Bringing the conductor into contact with the NO terminal switches on the relay contact from off, and detaching the conductor from the NO terminal switches off the relay contact from on.

The resistance value of the ON-resistance of the relay contact is approximately zero Ω. Thus, if an electric current flows through the relay contact, the width of increase of the temperature of the relay contact is extremely small. However, with the relay contact, the relay contact is switched on and off by physically moving the conductor, and thus the number of times of switching on and off the relay contact is limited. Thus, if the number of times of switching on or off the relay contact exceeds a predetermined number of times, for example, 30 thousand times, the relay contact needs to be replaced.

As described above, a power supply control device configured to supply power via a semiconductor switch if the semiconductor switch has a low temperature and to supply power via a relay contact if the semiconductor switch has a high temperature is conceivable as a power supply control device configured to control supply of power via a semiconductor switch and a relay contact.

With such a power supply control device, it is preferable that the frequency of switching on and off the relay contact is reduced while the temperature of the semiconductor switch is maintained at not more than a predetermined temperature. In order to realize this, it is necessary to switch on the relay contact and switch off the semiconductor switch at appropriate timing.

In view of this, an object is to provide a power supply control device capable of switching on the relay contact and switching off the semiconductor switch at appropriate timing, and a power supply control method and a computer program with which the relay contact can be switched on and the semiconductor switch can be switched off at appropriate timing.

Advantageous Effects of Disclosure

According to this disclosure, it is possible to switch on the relay contact and switch off the semiconductor switch at appropriate timing.

SUMMARY

A power supply control device according to one aspect of the present disclosure is a power supply control device configured to control supply of power via a switch circuit including a semiconductor switch and a relay contact that is connected in parallel to the switch circuit, the power supply control device including a detection unit configured to detect an electric current flowing through the switch circuit; a determination unit configured to determine whether or not the electric current detected by the detection unit is at least a threshold when the semiconductor switch is on and the relay contact is off a switching unit configured to, if the determination unit has determined that the electric current is at least the threshold, switch on the relay contact and switch off the semiconductor switch; and a changing unit configured to change the threshold in accordance with a length of the lapse of time from when an electric current flows through the switch circuit.

A power supply control method according to one aspect of the present disclosure is a power supply control method for controlling supply of power via a switch circuit including a semiconductor switch and a relay contact that is connected in parallel to the switch circuit, the method including a step of detecting an electric current flowing through the switch circuit; a step of determining whether or not the electric current detected in the determination unit is at least a threshold when the semiconductor switch is on and the relay contact is off a step of, if it is determined that the electric current is at least the threshold, switching on the relay contact and switching off the semiconductor switch; and a step of changing the threshold in accordance with a length of the lapse of time from when an electric current flows through the switch circuit.

A computer program according to one aspect of the present disclosure is a computer program for causing a computer to control supply of power via a switch circuit including a semiconductor switch and a relay contact that is connected in parallel to the switch circuit, the program causing the computer to execute a step of acquiring electric current information indicating an electric current flowing through the switch circuit; a step of determining whether or not the electric current indicated by the acquired electric current information is at least a threshold when the semiconductor switch is on and the relay contact is off a step of, if it is determined that the electric current is at least the threshold, switching on the relay contact and switching off the semiconductor switch; and a step of changing the threshold in accordance with a length of the lapse of time from when an electric current flows through the switch circuit.

Note that the present disclosure can be realized as not only a power supply control device including such characteristic processing units but also a power supply control method including such characteristic processes as steps or a computer program for causing a computer to execute these steps. Also, the present disclosure can be realized as a semiconductor integrated circuit for realizing part of all of the power supply control device or as a power supply control system including the power supply control device.

DETAILED DESCRIPTION OF PREFERRED EMBODIMENTS

First, embodiments of the present disclosure will be described below. At least portions of the embodiments described below may also be combined.

A power supply control device according to one aspect of the present disclosure is a power supply control device configured to control supply of power via a switch circuit including a semiconductor switch and a relay contact that is connected in parallel to the switch circuit, the power supply control device including a detection unit configured to detect an electric current flowing through the switch circuit; a determination unit configured to determine whether or not the electric current detected by the detection unit is at least a threshold when the semiconductor switch is on and the relay contact is off a switching unit configured to, if the determination unit has determined that the electric current is at least the threshold, switch on the relay contact and switch off the semiconductor switch; and a changing unit configured to change the threshold in accordance with a length of the lapse of time from when an electric current flows through the switch circuit.

The power supply control device according to one aspect of the present disclosure includes a setting unit configured to, if the determination unit has determined that the electric current is at least the threshold, set a period in accordance with the threshold used by the determination unit in the determination, and if the period set by the setting unit has elapsed after the relay contact is switched on and the semiconductor switch is switched off, the switching unit switches on the semiconductor switch and switches off the relay contact.

In the power supply control device according to one aspect of the present disclosure, the number of semiconductor switches is two, the two semiconductor switches are FETs, a source of one of the semiconductor switches is connected to a source of the other of the semiconductor switches, and the relay contact is connected between drains of the two semiconductor switches.

A power supply control method according to one aspect of the present disclosure is a power supply control method for controlling supply of power via a switch circuit including a semiconductor switch and a relay contact that is connected in parallel to the switch circuit, the method including a step of detecting an electric current flowing through the switch circuit; a step of determining whether or not the electric current detected in the determination unit is at least a threshold when the semiconductor switch is on and the relay contact is off a step of, if it is determined that the electric current is at least the threshold, switching on the relay contact and switching off the semiconductor switch; and a step of changing the threshold in accordance with a length of the lapse of time from when an electric current flows through the switch circuit.

A computer program according to one aspect of the present disclosure is a computer program for causing a computer to control supply of power via a switch circuit including a semiconductor switch and a relay contact that is connected in parallel to the switch circuit, the program causing the computer to execute a step of acquiring electric current information indicating an electric current flowing through the switch circuit; a step of determining whether or not the electric current indicated by the acquired electric current information is at least a threshold when the semiconductor switch is on and the relay contact is off a step of, if it is determined that the electric current is at least the threshold, switching on the relay contact and switching off the semiconductor switch; and a step of changing the threshold in accordance with a length of the lapse of time from when an electric current flows through the switch circuit.

With the power supply control device, the power supply control method, and the computer program according to one aspect of the present disclosure, when the semiconductor switch is on and the relay contact is off, it is determined whether or not an electric current flowing through the switch circuit is at least the threshold. If it is determined that this electric current is at least the threshold, the relay contact is switched on, and the semiconductor switch is switched off.

If an electric current flows through the switch circuit, the temperature of the switch circuit increases as long as the amount of heat generated by the ON-resistance of the semiconductor switch exceeds the amount of heat released from the semiconductor switch. The larger the electric current flowing through the semiconductor switch is, the higher the temperature of the switch circuit is, and the longer the period in which an electric current flows through the switch circuit is, the higher the temperature of the switch circuit is. The threshold is changed in accordance with the length of the lapse of time from when an electric current flows through the switch circuit. For example, the longer the lapse of time is, the further the threshold is reduced. Accordingly, it is possible to switch on the relay contact and switch off the semiconductor switch at appropriate timing, for example, at a time when the temperature of the switch circuit approximately coincides with a predetermined temperature.

With the power supply control device according to one aspect of the present disclosure, if it is determined that the electric current flowing through the switch circuit is at least a threshold, a period is set in accordance with the threshold used in this determination. After the relay contact is switched on and the semiconductor switch is switched off, if the set period has elapsed, then the semiconductor switch is switched on and the relay contact is switched off. The larger the threshold is which is used to determine the electric current flowing through the switch circuit, the longer the period is which is set in accordance with the threshold used in the determination. In this case, it is possible to switch on the semiconductor switch and switch off the relay contact in a state in which the temperature of the switch circuit is sufficiently lower than a predetermined temperature.

In the power supply control device according to one aspect of the present disclosure, the switch circuit includes two semiconductor switches. These semiconductor switches are FETs, and a source of one of the semiconductor switches is connected to a source of the other of the semiconductor switches. The relay contact is connected between the drains of the two semiconductor switches. If the two semiconductor switches are the same type of FET, no electric current flows through parasitic diodes formed between drains and sources of the two semiconductor switches as long as the two semiconductor switches are off.

DETAILED DESCRIPTION OF EMBODIMENTS OF DISCLOSURE

A specific example of a power supply control device according to an embodiment of the present disclosure will be described with reference to the drawings. Note that the present disclosure is not limited to these examples, but is indicated by the scope of the claims, and all changes that come within the meaning and range of equivalency of the claims are intended to be embraced therein.

Figure 1:
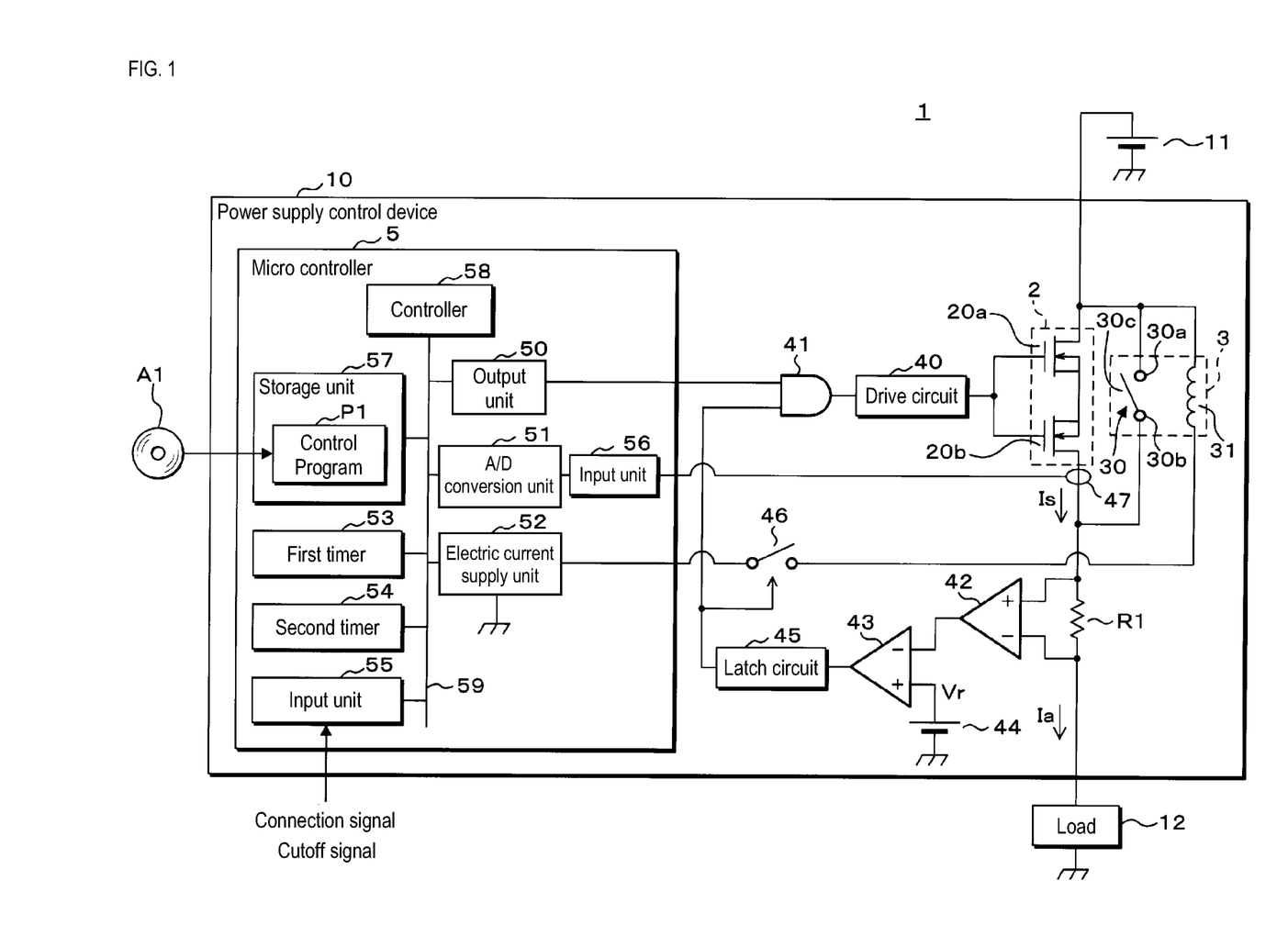
FIG. 1 is a block diagram showing the configuration of the main portions of a power supply system in an embodiment.

FIG. 1 is a block diagram showing the configuration of the main portions of a power supply system 1 in the present embodiment. The power supply system 1 includes a power supply control device 10, a battery 11, and a load 12. The power supply control device 10 is connected to a positive electrode of the battery 11, and one end of the load 12. A negative electrode of the battery 11 and the other end of the load 12 are grounded.

The power supply control device 10 receives a connection signal for instructing forming a connection between the battery 11 and the load 12, and a cutoff signal for instructing cutting off the connection between the battery 11 and the load 12. If the power supply control device 10 receives the connection signal, then the power supply control device 10 connects the battery 11 and the load 12, and if the power supply control device 10 receives the cutoff signal, the power supply control device 10 cuts off the connection between the battery 11 and the load 12. As described above, the power supply control device 10 controls the supply of power from the battery 11 to the load 12 by connecting the batter 11 and the load 12 and cutting off the connection.

The load 12 is an electric device installed in the vehicle. Power is supplied from the battery 11 to the load 12 via the power supply control device 10. The load 12 is activated using power supplied from the battery 11. If the load 12 is activated in a state in which the power supply control device 10 connects the battery 11 and the load 12, an electric current flows from the positive electrode of the battery 11, through the power supply control device 10 to the load 12 in this order, and returns to the negative electrode of the battery 11.

If the load 12 stops operating, the supply of power from the battery 11 to the load 12 via the power supply control device 10 stops. If the power supply control device 10 cuts off connection between the battery 11 and the load 12, then no power is supplied from the battery 11 to the load 12.

The power supply control device 10 includes a switch circuit 2, a relay 3, a drive circuit 40, an AND circuit 41, a differential amplifier 42, a comparator 43, a DC power source 44, a latch circuit 45, a switch 46, an electric current sensor 47, a microcontroller 5, and a resistor R1. The switch circuit 2 includes two semiconductor switches 20a and 20b. The semiconductor switches 20a and 20b are N-channel FETs (Field Effect Transistors). The relay 3 includes a relay contact 30 and a relay coil 31. The relay contact 30 includes a NO-terminal 30a, a COM-terminal 30b, and a conductor 30c whose end is connected to the COM-terminal 30b.

The drive circuit 40 and the latch circuit 45 each have an input terminal and an output terminal. The AND circuit 41 has two input terminals and one output terminal. The differential amplifier 42 and the comparator 43 each have a plus terminal, a minus terminal, and an output terminal.

The drain of the semiconductor switch 20a of the switch circuit 2 is connected to the positive electrode of the battery 11. In the switch circuit 2, the source of the semiconductor switch 20a is connected to the source of the semiconductor switch 20b. The drain of the semiconductor switch 20b is connected to one end of the resistor R1. The other end of the resistor R1 is connected to one end of the load 12. The relay contact 30 of the relay 3 is connected in parallel to the switch circuit 2. Specifically, the NO-terminal 30a of the relay contact 30 is connected to the drain of the semiconductor switch 20a, and the COM-terminal 30b of the relay contact 30 is connected to the drain of the semiconductor switch 20b.

Herein, "parallel" does not mean parallel in a strict meaning. The relay contact 30 should be connected substantially in parallel to the switch circuit 2. For example, the relay contact 30 may also be connected in parallel to a series circuit of the switch circuit 2 and a resistor (not shown).

Also, the COM-terminal 30b of the relay contact 30 may be connected to the drain of the semiconductor switch 20a, and the NO-terminal 30a of the relay contact 30 may be connected to the drain of the semiconductor switch 20b.

The drain of the semiconductor switch 20a is further connected to one end of the relay coil 31, and the other end of the relay coil 31 is connected to one end of the switch 46. The other end of the switch 46 is connected to the microcontroller 5. Gates of the semiconductor switches 20a and 20b are connected to the output terminal of the drive circuit 40. The input terminal of the drive circuit 40 is connected to the output terminal of the AND circuit 41. One of the input terminals of the AND circuit 41 is connected to the microcontroller 5. The other of the input terminals of the AND circuit 41 is connected to the output terminal of the latch circuit 45.

One end and the other end of the resistor R1 are respectively connected to the plus terminal and the minus terminal of the differential amplifier 42. The output terminal of the differential amplifier 42 is connected to the minus terminal of the comparator 43. The plus terminal of the comparator 43 is connected to the positive electrode of the DC power source 44. The negative electrode of the DC power source 44 is grounded. The output terminal of the comparator 43 is connected to the input terminal of the latch circuit 45. The electric current sensor 47 has an annular shape, and encloses a lead wire that connects the drain of the semiconductor switch 20b and one end of the resistor R1. The electric current sensor 47 is located at a position that is closer to the semiconductor switch 20b than a connection point at which the drain of the semiconductor switch 20b is connected to the COM-terminal 30b of the relay contact 30. The electric current sensor 47 is connected to the microcontroller 5.

If the voltages at the gates of the semiconductor switches 20a and 20b have at least a certain value, an electric current can flow between the drains and the sources. At this time, the semiconductor switches 20a and 20b are on. Also, if the voltages at the gates of the semiconductor switches 20a and 20b have less than a certain value, no electric current flows between the drains and the sources. At this time, the semiconductor switches 20a and 20b are off.

The drive circuit 40 switches on and off the semiconductor switches 20a and 20b approximately simultaneously by adjusting the voltages at the gates of the semiconductor switches 20a and 20b. The AND circuit 41 outputs, from its output terminal, a high-level voltage or a low-level voltage to the input terminal of the drive circuit 40. If a voltage that is received from the AND circuit 41 is switched from a low-level voltage to a high-level voltage, then the drive circuit 40 switches on the semiconductor switches 20a and 20b from off. Also, if a voltage that is received from the AND circuit 41 is switched from a high-level voltage to a low-level voltage, then the drive circuit 40 switches off the semiconductor switches 20a and 20b from on.

The microcontroller 5 outputs the high-level voltage or the low-level voltage to one of the input terminals of the AND circuit 41. The latch circuit 45 outputs the high-level voltage or the low-level voltage to the other of the input terminals of the AND circuit 41.

If the latch circuit 45 outputs the high-level voltage, then the AND circuit 41 directly outputs, from its output terminal, the voltage output from the microcontroller 5 to the input terminal of the drive circuit 40. Thus, the drive circuit 40 switches on and off the semiconductor switches 20a and 20b in accordance with the voltage output from the microcontroller 5 as long as the latch circuit 45 outputs the high-level voltage.

If the latch circuit 45 outputs the low-level voltage, then the AND circuit 41 outputs, from its output terminal, the low-level voltage to the drive circuit 40 regardless of the voltage output from the microcontroller 5. In this case, the drive circuit 40 keeps the semiconductor switches 20a and 20b off.

The microcontroller 5 grounds and opens the other end of the switch 46. If the microcontroller 5 grounds the other end of the switch 46 in a state in which the switch 46 is on, an electric current is supplied from the battery 11 to the relay coil 31. Accordingly, a magnetic field is generated around the relay coil 31, the conductor 30c is attracted to the NO-terminal 30a, and the conductor 30c comes into contact with the NO-terminal 30a. At this time, an electric current can flow between he NO-terminal 30a and the COM-terminal 30b, and the relay contact 30 is switched on.

If the switch 46 is switched off or the microcontroller 5 opens the other end of the switch 46, then the supply of an electric current to the relay coil 31 stops. Accordingly, the conductor 30c detaches from the NO-terminal 30a, thus no electric current flows between the NO-terminal 30a and the COM-terminal 30b, and the relay contact 30 is switched off.

If the latch circuit 45 outputs the high-level voltage, the switch 46 is on. If the latch circuit 45 outputs the low-level voltage, the switch 46 is off.

Thus, because the switch 46 is on if the latch circuit 45 outputs the high-level voltage, the relay contact 30 is switched on or off by the microcontroller 5. Because the switch 46 is off if the latch circuit 45 outputs the low-level voltage, the relay contact 30 is off regardless of the operation of the microcontroller 5.

The differential amplifier 42 outputs, from its output terminal, a voltage expressed by the product of a voltage across both ends of the resistor R1 and a predetermined positive number K to the minus terminal of the comparator 43. The voltage across both ends of the resistor R1 is expressed by the product of a load electric current Ia flowing through the load 12 and a resistance value r1 of the resistor R1. Thus, the minus terminal of the comparator 43 receives a voltage expressed by K·r1·Ia. "·" indicates multiplication.

A reference voltage Vr is output from the DC power source 44 to the plus terminal of the comparator 43. The reference voltage Vr is a constant voltage.

If the voltage (=K·r1·Ia) output from the differential amplifier 42 is less than the reference voltage Vr, that is, if the load electric current Ia is less than a constant reference electric current Ir (=Vr/(K·r1)), then the comparator 43 outputs the high-level voltage from its output terminal to the input terminal of the latch circuit 45.

Also, if the voltage output from the differential amplifier 42 is at least the reference voltage Vr, that is, if the load electric current Ia is at least the reference electric current Ir, then the comparator 43 outputs the low-level voltage from its output terminal to the input terminal of the latch circuit 45.

The latch circuit 45 outputs the high-level voltage from its output terminal while the comparator 43 is outputting the high-level voltage, that is, while the load electric current Ia is less than the reference electric current Ir. At this time, the high-level voltage is input to the other of the input terminals of the AND circuit 41, and the switch 46 is on.

If the voltage output from the comparator 43 is switched from the high-level voltage to the low-level voltage, that is, if the load electric current Ia is at least the reference electric current Ir, then the latch circuit 45 outputs the low-level voltage from its output terminal. At this time, the low-level voltage is input to the other of the input terminals of the AND circuit 41, and the switch 46 is off. Thus, if the load electric current Ia is at least the reference electric current Ir, the semiconductor switches 20a and 20b and the relay contact 30 are switched off, regardless of the operation of the microcontroller 5.

After the voltage output from the comparator 43 is switched from the high-level voltage to the low-level voltage, the latch circuit 45 continues to output the low-level voltage regardless of the voltage output from the comparator 43. In other words, after the load electric current Ia is at least the reference electric current Ir, the latch circuit 45 continues to output the low-level voltage regardless of the load electric current Ia.

The electric current sensor 47 detects a switch electric current Is flowing through the switch circuit 2, and outputs, to the microcontroller 5, analog electric current information indicating the detected switch electric current Is. The electric current information is a voltage that is proportional to the switch electric current Is, for example. The electric current sensor 47 functions as a detection unit.

A connection signal and a cutoff signal are input to the microcontroller 5. The microcontroller 5 outputs the high-level voltage or the low-level voltage to one of the input terminals of the AND circuit 41, and grounds or opens the other end of the switch 46, based on the input signals and the information on the electric current detected by the electric current sensor 47.

As described above, the latch circuit 45 outputs the high-level voltage while the load electric current Ia is less than the reference electric current Ir. Thus, the semiconductor switches 20a and 20b are switched on or off in accordance with the voltage output from the microcontroller 5, and the relay contact 30 is switched on or off by the microcontroller 5, while the load electric current Ia is less than the reference electric current Ir.

If the load electric current Ia is at least the reference electric current Ir, the latch circuit 45 outputs the low-level voltage. Accordingly, the semiconductor switches 20a and 20b and the relay contact 30 are switched off regardless of the operation of the microcontroller 5. After the load electric current Ia is at least the reference electric current Ir, the semiconductor switches 20a and 20b and the relay contact 30 are kept off, regardless of the load electric current Ia and the operation of the microcontroller 5.

The microcontroller 5 includes an output unit 50, an A (Analog)/D (Digital) conversion unit 51, an electric current supply unit 52, a first timer 53, a second timer 54, input units 55 and 56, a storage unit 57, and a controller 58. The output unit 50, the A/D conversion unit 51, the electric current supply unit 52, the first timer 53, the second timer 54, the input unit 55, the storage unit 57, and the controller 58 are connected to a bus 59. The output unit 50 is connected to one of the input terminals of the AND circuit 41, in addition to the bus 59. The A/D conversion unit 51 is connected to the input unit 56, in addition to the bus 59. The input unit 56 is further connected to the electric current sensor 47. The electric current supply unit 52 is connected to the other end of the switch 46, in addition to the bus 59. The electric current supply unit 52 is grounded.

The output unit 50 outputs the high-level voltage or the low-level voltage to one of the input terminals of the AND circuit 41. The output unit 50 switches the voltage that is output to the one of the input terminals of the AND circuit 41, to the high-level voltage or the low-level voltage in accordance with the instruction received from the controller 58.

The input unit 56 receives the analog electric current information from the electric current sensor 47. The input unit 56 outputs, to the A/D conversion unit 51, the analog electric current information that was received from the electric current sensor 47. The A/D conversion unit 51 converts the analog electric current information that was input from the input unit 56 to digital electric current information. The controller 58 acquires, from the A/D conversion unit 51, the digital electric current information that was converted by the A/D conversion unit 51. The switch electric current Is indicated by the electric current information acquired by the controller 58 approximately coincides with the switch electric current Is detected by the electric current sensor 47 at acquisition time.

The electric current supply unit 52 grounds or opens the other end of the switch 46 in accordance with the instruction received by the controller 58. If the electric current supply unit 52 grounds the other end of the switch 46 in a state in which the switch 46 is on, an electric current is supplied to the relay coil 31, and the relay contact 30 is switched on. If the electric current supply unit 52 opens the other end of the switch 46, then the supply of an electric current to the relay coil 31 is stopped, and the relay contact 30 is switched off.

A connection signal and a cutoff signal are input to the input unit 55. If the connection signal or an input signal is input to the input unit 55, the input unit 55 notifies the controller 58 about it.

The first timer 53 and the second timer 54 start and end clocking a time period according to the instruction received from the controller 58. A first clocking time period that is clocked by the first timer 53 is read out from the first timer 53 by the controller 58. A second clocking time period that is clocked by the second timer 54 is read out from the second timer 54 by the controller 58.

The storage unit 57 is a non-volatile memory. A control program P1 is stored in the storage unit 57.

The controller 58 includes a CPU (Central Processing Unit) (not shown). The CPU of the controller 58 executes connection processing, cutoff processing, switch change processing, and threshold change processing by executing the control program P1 stored in the storage unit 57. The connection processing is processing for connecting the battery 11 and the load 12. The cutoff processing is processing for cutting off the connection between the battery 11 and the load 12. The switch change processing is processing for changing the switch for connecting the battery 11 and the load 12 from the semiconductor switches 20a and 20b to the relay contact 30 if the switch electric current Is is at least a threshold Ith. The threshold change processing is processing for changing the threshold Ith used in the switch change processing. The control program P1 is a computer program for causing the CPU of the controller 58 to execute the connection processing, the cutoff processing, the switch change processing, and the threshold change processing.

Note that the control program P1 may also be stored in a storage medium A1 in a computer-readable manner. In this case, the control program P1 that is read out by a reading device (not shown) from the storage medium A1 is stored in the storage unit 57. The storage medium A1 is an optical disk, a flexible disk, a magnetic disk, a magneto-optical disk, or a semiconductor memory, for example. The optical disk is a CD (Compact Disc)-ROM (Read Only Memory), a DVD (Digital Versatile Disc)-ROM, or a BD (Blu-ray (registered trademark) Disc), for example. The magnetic disk is a hard disk, for example. Also, the control program P1 may be downloaded from an external apparatus (not shown) connected to a communication network (not shown), and the downloaded control program P1 may be stored in the storage unit 57.

State flag values that are used in the connection processing, the cutoff processing, and the switch change processing are stored in the storage unit 57.

Figure 2:
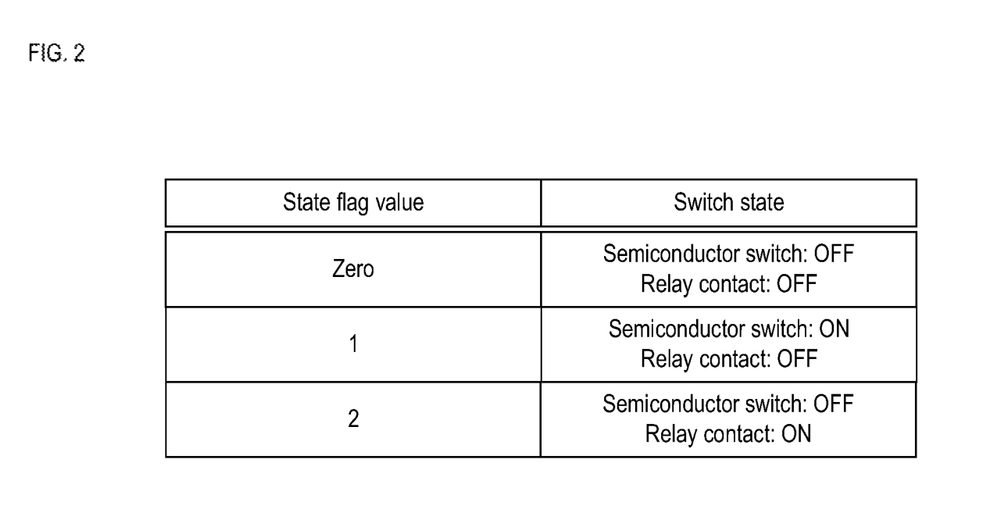
FIG. 2 is a table illustrating state flags.

FIG. 2 is a table illustrating the state flags. As shown in FIG. 2, when the state flag value is zero, the semiconductor switches 20a and 20b and the relay contact 30 are off. When the state flag value is 1, the semiconductor switches 20a and 20b are on, and the relay contact 30 is off. When the state flag value is 2, the semiconductor switches 20a and 20b are off, and the relay contact 30 is on. The state flag values stored in the storage unit 57 are changed by the controller 58.

Timer flag values used in the threshold change processing are also stored in the storage unit 57. When the timer flag value is zero, the first timer 53 is not clocking a time period. When the timer flag value is 1, the first timer 53 clocks a time period. The timer flag value is changed by the controller 58.

Hereinafter, the connection processing, the cutoff processing, the switch change processing, and the threshold change processing will be described. In the description below, it is presumed that the load electric current Ia is less than the reference electric current Ir, and the latch circuit 45 outputs the high-level voltage. As described above, if the load electric current Ia is at least the reference electric current Ir, the voltage output from the latch circuit 45 is switched from the high-level voltage to the low-level voltage, and the semiconductor switches 20a and 20b and the relay contact 30 are switched off, regardless of the operation of the microcontroller 5.

Figure 3:
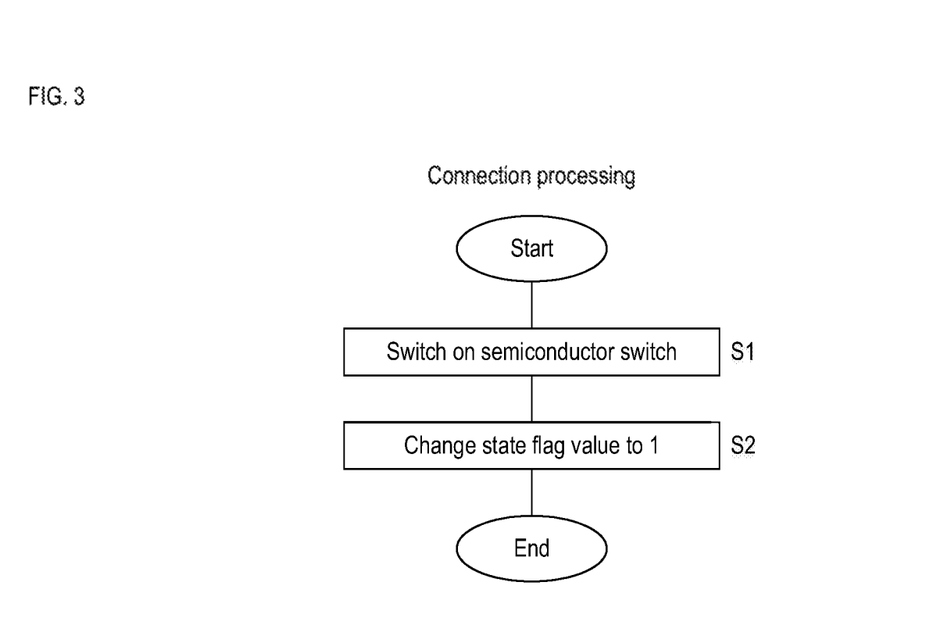
FIG. 3 is a flowchart showing a procedure of connection processing.

FIG. 3 is a flowchart showing a procedure of connection processing. The controller 58 executes the connection processing every time the connection signal is input to the input unit 55. The connection signal is input to the input unit 55 in a state in which the semiconductor switches 20a and 20b and the relay contact 30 are off.

In the connection processing, first, the controller 58 causes the drive circuit 40 to switch on the semiconductor switches 20a and 20b (step S1). Specifically, the controller 58 instructs the output unit 50 to switch, to the high-level voltage, the voltage that is output from the output unit 50 to the one of the input terminals of the AND circuit 41. Because the latch circuit 45 outputs the high-level voltage, the AND circuit 41 directly outputs the voltage that is output from the output unit 50, and the drive circuit 40 switches on the semiconductor switches 20a and 20b. When the controller 58 has ended step S1, the semiconductor switches 20a and 20b are on, and the relay contact 30 is off.

After executing step S1, the controller 58 sets the state flag value to 1 (step S2) and ends the connection processing.

Figure 4:
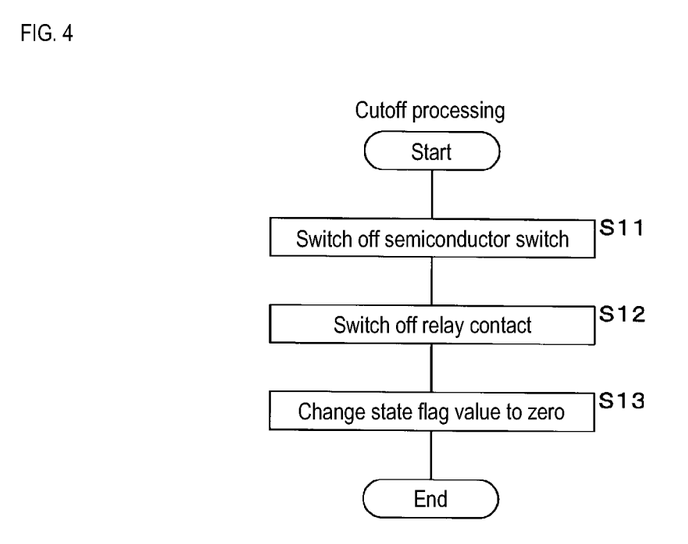
FIG. 4 is a flowchart showing a procedure of cutoff processing.

FIG. 4 is a flowchart showing a procedure of cutoff processing. The controller 58 executes the cutoff processing every time the cutoff signal is input to the input unit 55. First, the controller 58 causes the drive circuit 40 to switch off the semiconductor switches 20a and 20b (step S11). Specifically, the controller 58 instructs the output unit 50 to switch, to the low-level voltage, the voltage that is output from the output unit 50 to the one of the input terminals of the AND circuit 41. Because the latch circuit 45 outputs the high-level voltage, the AND circuit 41 directly outputs the voltage that is output from the output unit 50 to the drive circuit 40, and the drive circuit 40 switches off the semiconductor switches 20a and 20b.

Next, the controller 58 instructs the electric current supply unit 52 to switch off the relay contact 30 (step S12). Specifically, the electric current supply unit 52 opens the other end of the switch 46.

Accordingly, the supply of an electric current to the relay coil 31 stops, and the relay contact 30 is switched off.

Thereafter, the controller 58 changes the state flag value to zero (step S13), and ends the cutoff processing.

Figure 5:
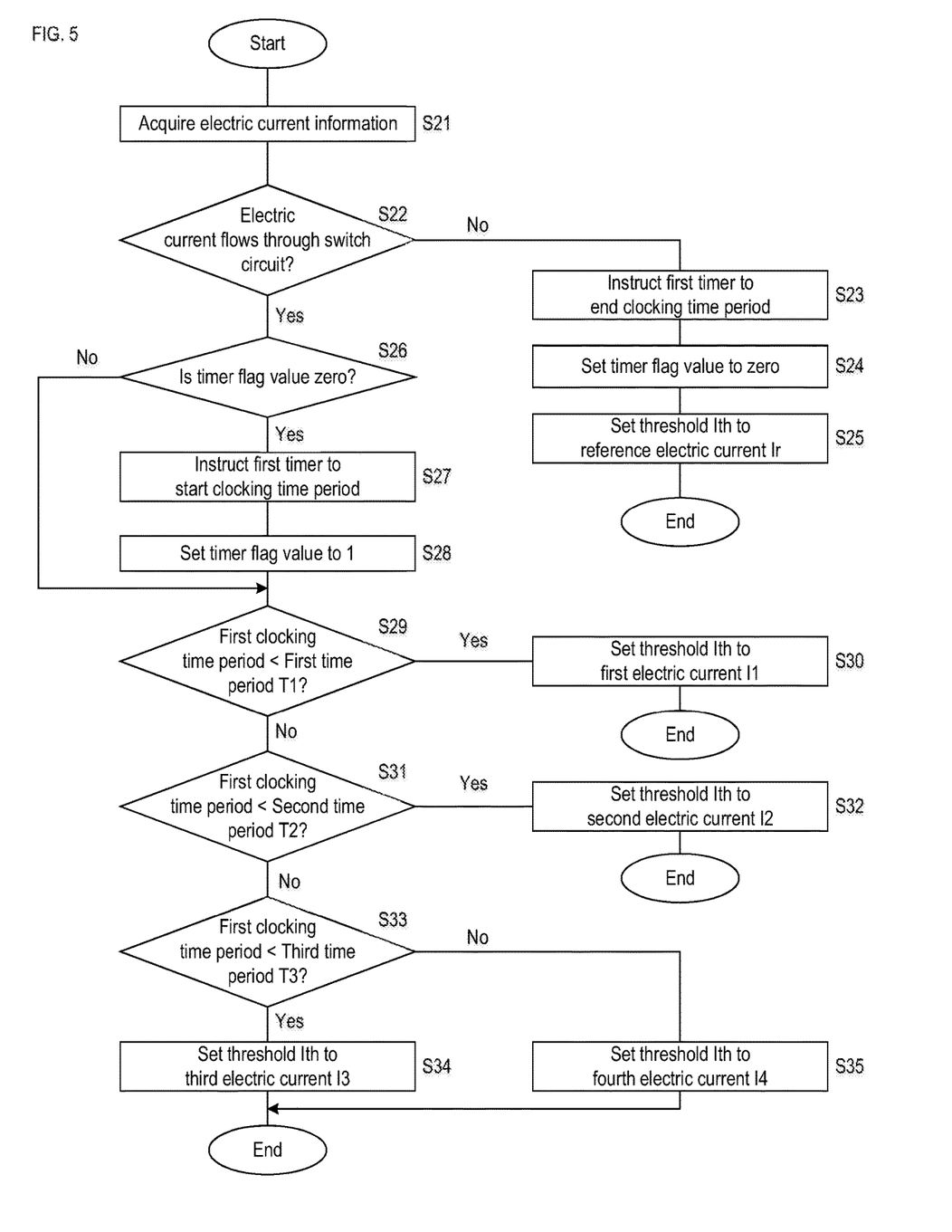
FIG. 5 is a flowchart showing a procedure of threshold change processing.

FIG. 5 is a flowchart showing a procedure of threshold change processing. The controller 58 cyclically executes the threshold change processing. The threshold information indicating the threshold Ith is stored in the storage unit 57. In the threshold change processing, the controller 58 sets the threshold Ith indicated by the threshold information to various electric currents.

A first time period T1, a second time period T2, and a third time period T3, which will be described later, are constant, and are stored in the storage unit 57 in advance. The second time period T2 is longer than the first time period T1, and the third time period T3 is longer than the second time period T2 (see FIG. 6).

Similarly, a first electric current I1, a second electric current I2, a third electric current I3, and a fourth electric current I4, which will be described later, are also constant, and are stored in the storage unit 57 in advance. The second electric current I2 is smaller than the first electric current I1, the third electric current I3 is smaller than the second electric current I2, and the fourth electric current I4 is smaller than the third electric current I3 (see FIG. 6).

The first electric current I1 is smaller than the reference electric current Ir. As described above, the reference electric current Ir is compared with the load electric current Ia. If the load electric current Ia is at least the reference electric current Ir, the latch circuit 45 outputs the low-level voltage.

In the threshold change processing, the controller 58 first acquires the electric current information from the A/D conversion unit 51 (step S21), and determines whether or not an electric current flows through the switch circuit 2 (step S22). Specifically, if the switch electric current Is indicated by the electric current information acquired in step S21 exceeds zero (A), then the controller 58 determines that an electric current flows through the switch circuit 2. If the switch electric current Is indicated by the electric current information acquired in step S21 is zero (A), then the controller 58 determines that no electric current flows through the switch circuit 2.

If the controller 58 has determined that no electric current flows through the switch circuit 2 (step S22: NO), then the controller 58 instructs the first timer 53 to end clocking a time period (step S23). Accordingly, the first timer 53 ends clocking a time period. If the first timer 53 is not clocking a time period, the controller 58 advances processing to step S24 without executing step S23.

After executing step S23, the controller 58 sets the timer flag value to zero (step S24), and sets the threshold Ith indicated by the threshold information to the reference electric current Ir (step S25). Thereafter, the controller 58 ends the threshold change processing.

If the controller 58 has determined that no electric current flows through the switch circuit 2 (step S22: YES), then the controller 58 determines whether or not the timer flag value is zero (step S26). If the controller 58 has determined that the timer flag value is zero, that is, if the controller 58 has determined that the first timer 53 is not clocking a time period (step S26: YES), then the controller 58 instructs the first timer 53 to start clocking a time period (step S27). Accordingly, the first timer 53 starts clocking a time period. After executing step S27, the controller 58 sets the timer flag value to 1 (step S28).

If the controller 58 has determined that the timer flag value is not zero, that is, if the controller 58 has determined that the timer flag value is 1 (step S26: NO), or after executing step S28, then the controller 58 determines whether or not the first clocking time period that is being clocked by the first timer 53 is less than the first time period T1 (step S29). If the controller 58 has determined that the first clocking time period is less than the first time period T1 (step S29: YES), then the controller 58 sets the threshold Ith indicated by the threshold information to the first electric current I1 (step S30), and ends the threshold change processing.

If the controller 58 has determined that the first clocking time period is at least the first time period T1 (step S29: NO), then the controller 58 determines whether or not the first clocking time period is less than the second time period T2 (>T1) (step S31). If the controller 58 has determined that the first clocking time period is less than the second time period T2 (step S31: YES), then the controller 58 sets the threshold Ith indicated by the threshold information to the second electric current I2 (<I1) (step S32), and ends the threshold change processing.

If the controller 58 has determined that the first clocking time period is at least the second time period T2 (step S31: NO), then the controller 58 determines whether or not the first clocking time period is less than the third time period T3 (>T2) (step S33). If the controller 58 has determined that the first clocking time period is less than the third time period T3 (step S33: YES), then the controller 58 sets the threshold Ith indicated by the threshold information to the third electric current I3 (<I2) (step S34), and ends the threshold change processing.

If the controller 58 has determined that the first clocking time period is at least the third time period T3 (step S33: NO), then the controller 58 sets the threshold Ith indicated by the threshold information to the fourth electric current I4 (<I3) (step S35), and ends the threshold change processing.

Note that if the controller 58 executes any one of the steps S30, S32, S34, and S35 and ends the threshold change processing, the first timer 53 continues to clock a time period, and the timer flag value is maintained at 1. That is, the first timer 53 continues to clock a time period until the switch electric current Is flowing through the switch circuit 2 reaches zero (A).

Figure 6:
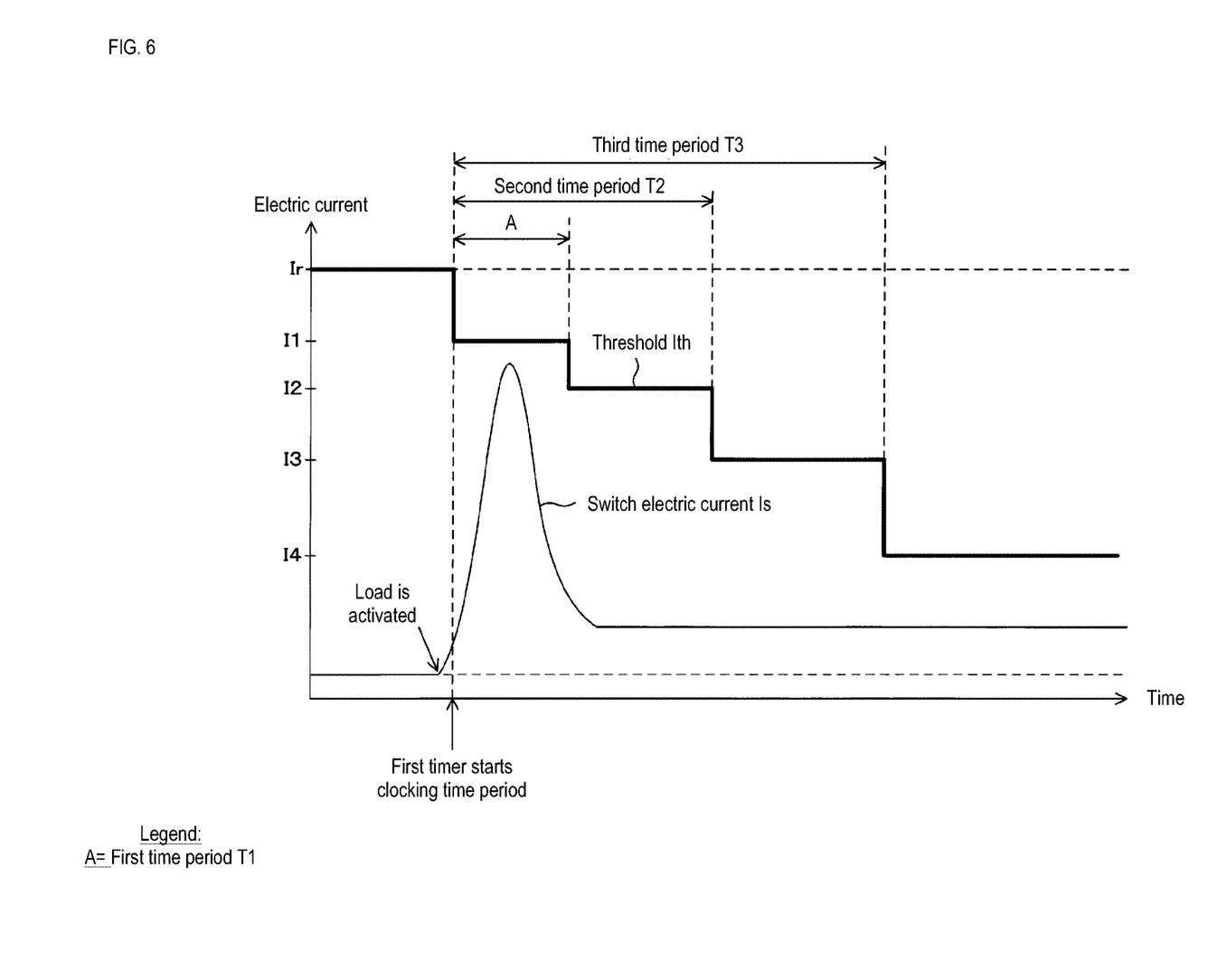
FIG. 6 is a graph showing an example of the change in a threshold.

FIG. 6 is a graph showing an example of the change in the threshold Ith. In FIG. 6, the change in the threshold Ith is indicated by a thick line, and the change in the switch electric current Is is indicated by a thin line. The vertical axis represents electric current, and the horizontal axis represents time.

As shown in FIG. 6, if no electric current flows through the switch circuit 2, that is, if the switch electric current Is is zero (A), the threshold Ith indicated by the threshold information is set to the reference electric current Ir.

If the load 12 is activated in a state in which the semiconductor switches 20a and 20b are on and the relay contact 30 is off, then an electric current flows from the positive electrode of the battery 11 to one end of the load 12 through the switch circuit 2 and the resistor R1, and the switch electric current Is exceeds zero (A).

In the threshold change processing that is executed first after the activation of the load 12, the switch electric current Is exceeds zero (A), and thus the first timer 53 starts clocking a time period. As described above, the first timer 53 continues to clock a time period until the switch electric current Is reaches zero (A). As shown in FIG. 6, in the following description, it is presumed that the switch electric current Is exceeds zero (A).

The threshold Ith indicated by the threshold information is set to the first electric current I1 while the first clocking time period that is clocked by the first timer 53, that is the lapse of time from when an electric current flows through the switch circuit 2 is less than the first time period T1.

The threshold Ith indicated by the threshold information is set to the second electric current I2 (<I1) while the lapse of time is at least the first time period T1 and is less than the second time period T2.

The threshold Ith indicated by the threshold information is set to the third electric current I3 (<I2) while the lapse of time is at least the second time period T2 and is less than the third time period T3.

If the lapse of time is at least the third time period T3, the threshold Ith indicated by the threshold information is set to the fourth electric current I4 (<I3).

As described above, in the threshold change processing, the controller 58 changes the threshold Ith indicated by the threshold information in accordance with the length of the lapse of time from when an electric current flows through the switch circuit 2. The controller 58 functions as the changing unit.

The load 12 has the smallest resistance when the supply of an electric current to the load 12 is started, and the resistance increases as the time period during which an electric current is supplied to the load 12 extends. After the resistance of the load 12 reached a predetermined value, the resistance of the load 12 is stabilized at the predetermined value as long as an electric current is continued to be supplied to the load 12. Thus, as shown in FIG. 6, an inrush current flows through the switch circuit 2 immediately after the activation of the load 12, and then the switch electric current Is is stabilized.

In the threshold change processing, the threshold Ith is high when the load 12 is activated. The threshold Ith then decreases as the lapse of time increases. Thus, an inrush current generated immediately after the activation of the load 12 is allowed to flow through the switch circuit 2. After the inrush current has flowed, an electric current that is similar to the inrush current is prevented from flowing through the switch circuit 2.

If the switch electric current Is is zero (A), then the controller 58 causes the first timer 53 to end clocking a time period, and sets the threshold Ith indicated by the threshold information to the reference electric current Ir.

Note that if the switch electric current Is is at least the reference electric current Ir, the load electric current Ia is also at least the reference electric current Ir, and thus the semiconductor switches 20a and 20b and the relay contact 30 are switched off, regardless of the operation of the microcontroller 5.

Figure 7:
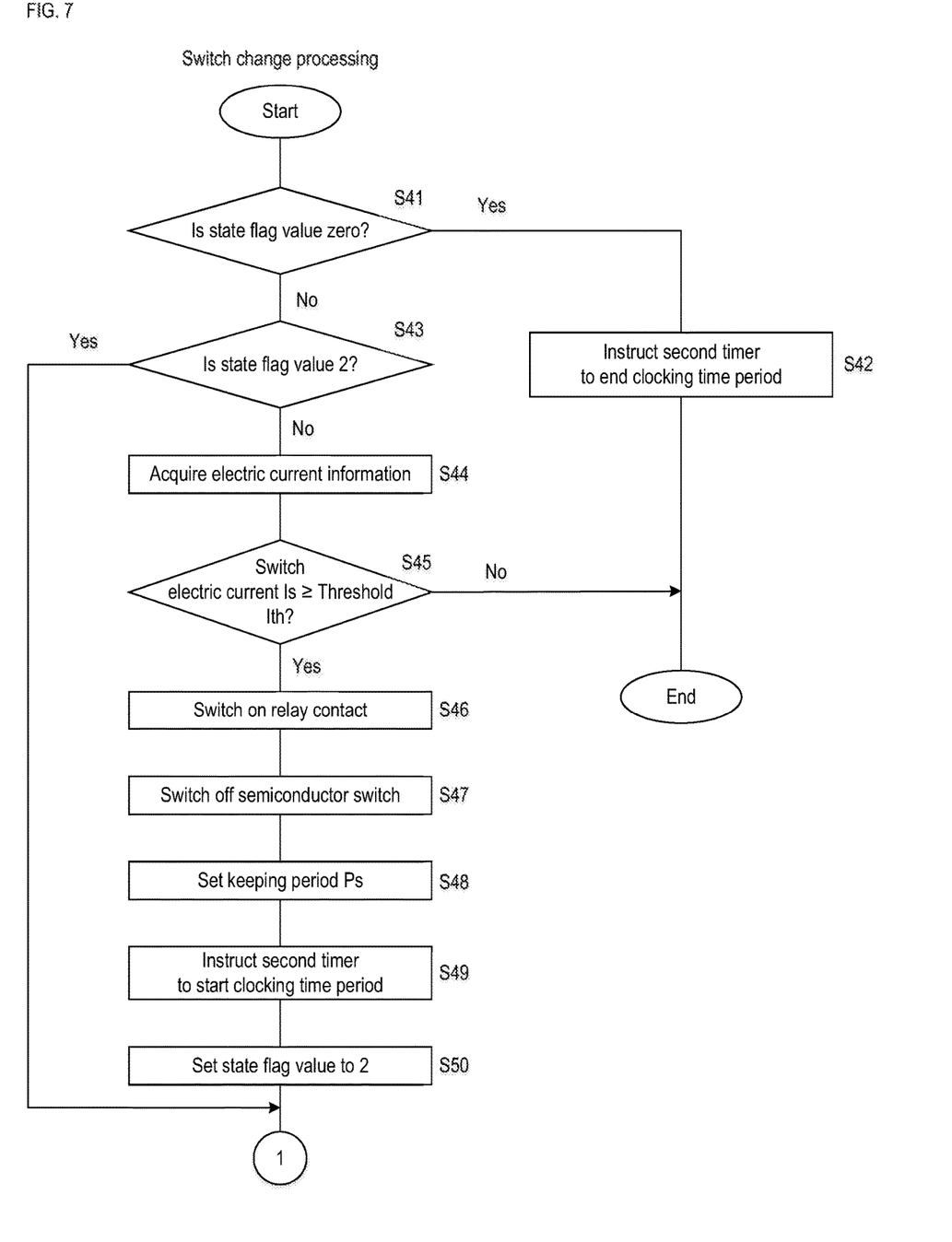
FIG. 7 is a flowchart showing a procedure of switch change processing.
Figure 8:
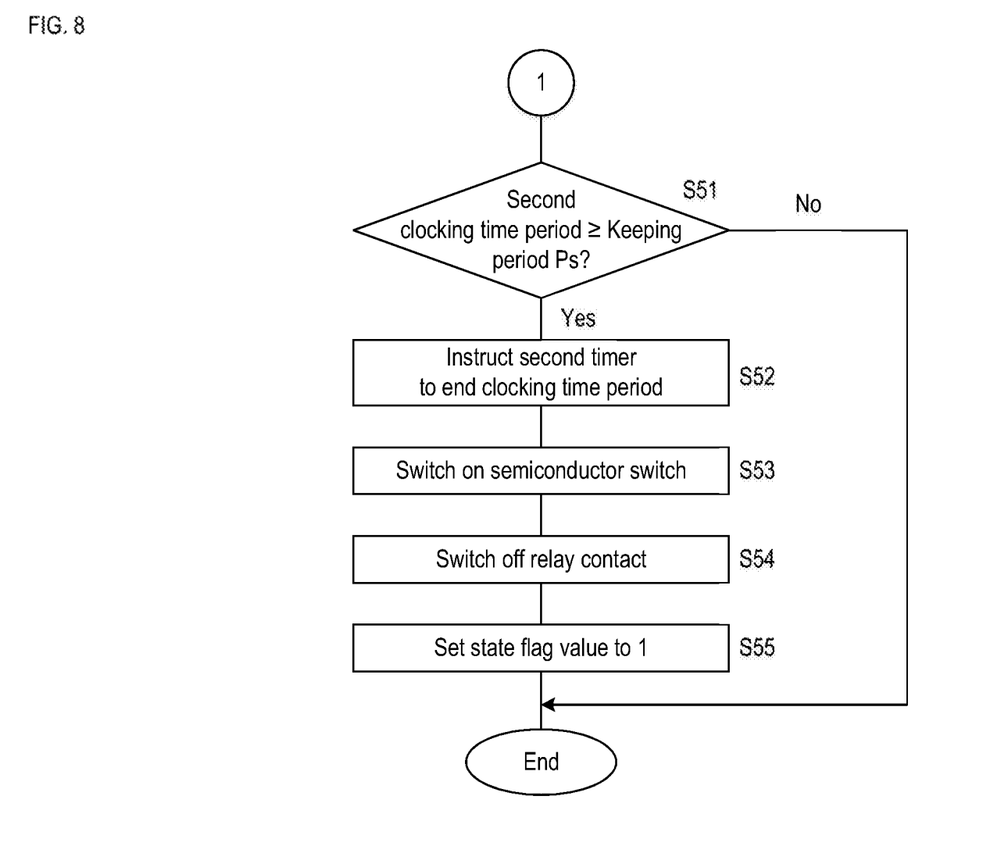
FIG. 8 is a flowchart showing a procedure of switch change processing.

FIGS. 7 and 8 are flowcharts showing a procedure of switch change processing. The controller 58 cyclically executes the switch change processing. A cycle related to the switch change processing preferably coincides with a cycle related to the threshold change processing, and the switch change processing is preferably executed immediately after execution of the threshold change processing.

The storage unit 57 stores period information indicating a keeping period Pk during which the semiconductor switches 20a and 20b are kept off and the relay contact 30 is kept on. The keeping period Pk indicated by the period information is set to various periods by the controller 58.

In the switch change processing, first, the controller 58 determines whether or not the state flag value is zero (step S41). If the controller 58 has determined that the state flag value is zero (step S41: YES), then the controller 58 instructs the second timer 54 to end clocking a time period (step S42). Accordingly, the second timer 54 ends clocking a time period. After executing step S42, the controller 58 ends the switch change processing. If the second timer 54 is not clocking a time period when the controller 58 has determined that the state flag value is zero, then the controller 58 ends the switch change processing without executing step S42.

If the controller 58 has determined that the state flag value is not zero (step S41: NO), then the controller 58 determines whether or not the state flag value is 2 (step S43). If the controller 58 has determined that the state flag value is not 2, that is, if the controller 58 has determined that the state flag value is 1 (step S43: NO), then the controller 58 acquires electric current information from the A/D conversion unit 51 (step S44), and determines whether or not the switch electric current Is indicated by the acquired electric current information is at least the threshold Ith indicated by the threshold information (step S45). The threshold Ith indicated by the threshold information is changed in the threshold change processing, and thus is set to one of the reference electric current Ir, the first electric current I1, the second electric current I2, the third electric current I3, and the fourth electric current I4. The controller 58 also functions as the determination unit.

If the controller 58 has determined that the switch electric current Is is less than the threshold Ith (step S45: NO), then the controller 58 ends the switch change processing.

Note that if the threshold Ith is set to the reference electric current Ir, in step S45, the controller 58 does not determine that the switch electric current Is is at least the threshold Ith. If the switch electric current Is is at least the threshold Ith, instantly, the voltage output from the latch circuit 45 is switched from the high-level voltage to the low-level voltage, and the semiconductor switches 20a and 20b and the relay contact 30 are switched off, regardless of the operation of the microcontroller 5. If the semiconductor switches 20a and 20b are off, the switch electric current Is is zero (A) and is less than the reference electric current Ir.

If the controller 58 has determined that the switch electric current Is is at least the threshold Ith (step S45: YES), then the controller 58 instructs the electric current supply unit 52 to switch on the relay contact 30 (step S46). Specifically, the electric current supply unit 52 grounds the other end of the switch 46. The latch circuit 45 outputs the high-level voltage, and the switch 46 is on. Thus, if the electric current supply unit 52 grounds the other end of the switch 46, an electric current is supplied to the relay coil 31, and the relay contact 30 is switched on. After executing step S46, similarly to step S11 of the cutoff processing, the controller 58 causes the drive circuit 40 to switch off the semiconductor switches 20a and 20b (step S47). A switch for connecting the battery 11 and the load 12 is changed from the semiconductor switches 20a and 20b to the relay contact 30 by the controller 58 executing steps S46 and S47. The drive circuit 40 and the electric current supply unit 52 function as switching units.

After executing step S47, the controller 58 sets a keeping period Ps indicated by the period information (step S48). The storage unit 57 stores periods that are to be set as the keeping period Ps, in association with electric currents that are to be set as the threshold Ith. The controller 58 sets the keeping period Ps based on this correspondence relationship and the threshold Ith used in the determination in step S45.

Figure 9:
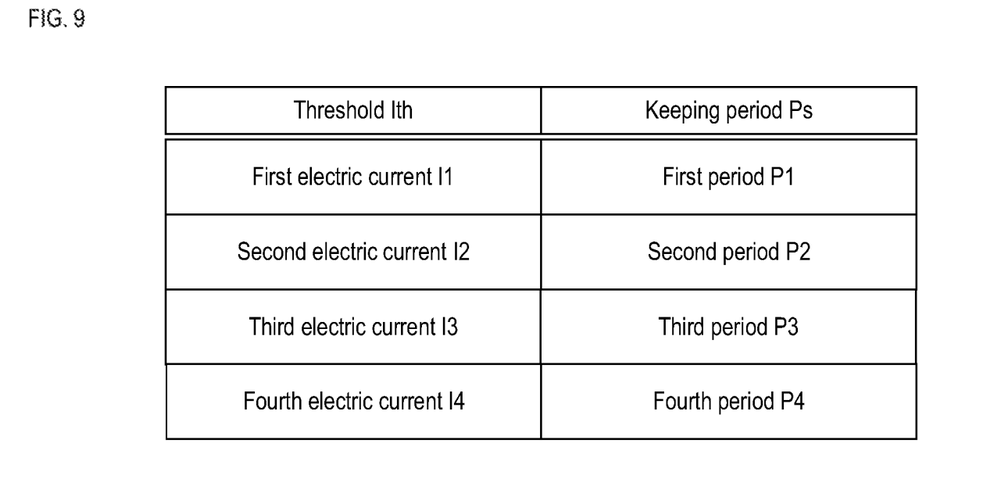
FIG. 9 is a table showing a correspondence relationship between a threshold and a keeping period.

FIG. 9 is a table showing a correspondence relationship between the threshold and the keeping period. The storage unit 57 stores the first period P1, the second period P2, the third period P3, and the fourth period P4, in association with the first electric current I1, the second electric current I2, the third electric current I3, and the fourth electric current I4. The first period P1, the second period P2, the third period P3, and the fourth period P4 are each constant. The second period P2 is shorter than the first period, the third period P3 is shorter than the second period P2, and the fourth period P4 is shorter than the third period P3.

In step S48, the controller 58 sets the keeping period Ps indicated by the period information to the threshold Ith indicated by the threshold information, that is, a period corresponding to the threshold Ith used in the determination in step S45. For example, if the threshold Ith used in the determination in step S45 is set to the first electric current I1, then the controller 58 sets, in step S48, the keeping period Ps indicated by the period information to the first period P1. The controller 58 also functions as a setting unit.

After executing step S48, the controller 58 instructs the second timer 54 to start clocking a time period (step S49). Accordingly, the second timer 54 starts clocking a time period. After executing step S49, the controller 58 sets the state flag value to 2 (step S50). If the controller 58 has determined that the state flag value is 2 (step S43: YES), or after executing step S50, then the controller 58 determines whether or not the second clocking time period that is clocked by the second timer 54 is at least the keeping period Ps indicated by the period information (step S51).

If the controller 58 has determined that the second clocking time period is less than the keeping period Ps (step S51: NO), then the controller 58 ends the switch change processing in a state in which the second timer 54 continues to clock a time period. The second timer 54 continues to clock a time period, and step S51 of the switch change processing is repeatedly executed, as long as the state flag value is maintained at 2. Before the second clocking time period is at least the keeping period Ps, the cutoff processing is executed, and if the state flag value is zero, step S42 of the switch change processing is executed, and the second timer 54 ends clocking a time period.

If the controller 58 has determined that the second clocking time period is at least the keeping period Ps (step S51: YES), then the controller 58 instructs the second timer 54 to end clocking a time period (step S52). Accordingly, the second timer 54 ends clocking a time period. Next, similarly to step S1 of the connection processing, the controller 58 causes the drive circuit 40 to switch on the semiconductor switches 20a and 20b (step S53), and similarly to step S12 of the cutoff processing, the controller 58 instructs the electric current supply unit 52 to switch off the relay contact 30 (step S54). A switch for connecting the battery 11 and the load 12 is changed from the relay contact 30 to the semiconductor switches 20a and 20b by the controller 58 executing steps S53 and S54. Thereafter, the controller 58 sets the state flag value to 1 (step S55), and ends the switch change processing.

As described above, in the connection processing, the cutoff processing, and the switch change processing, the controller 58 controls the supply of power via the switch circuit 2 and the relay contact 30 by causing the drive circuit 40 and the electric current supply unit 52 to switch on and off the semiconductor switches 20a and 20b and the relay contact 30.

Figure 10:
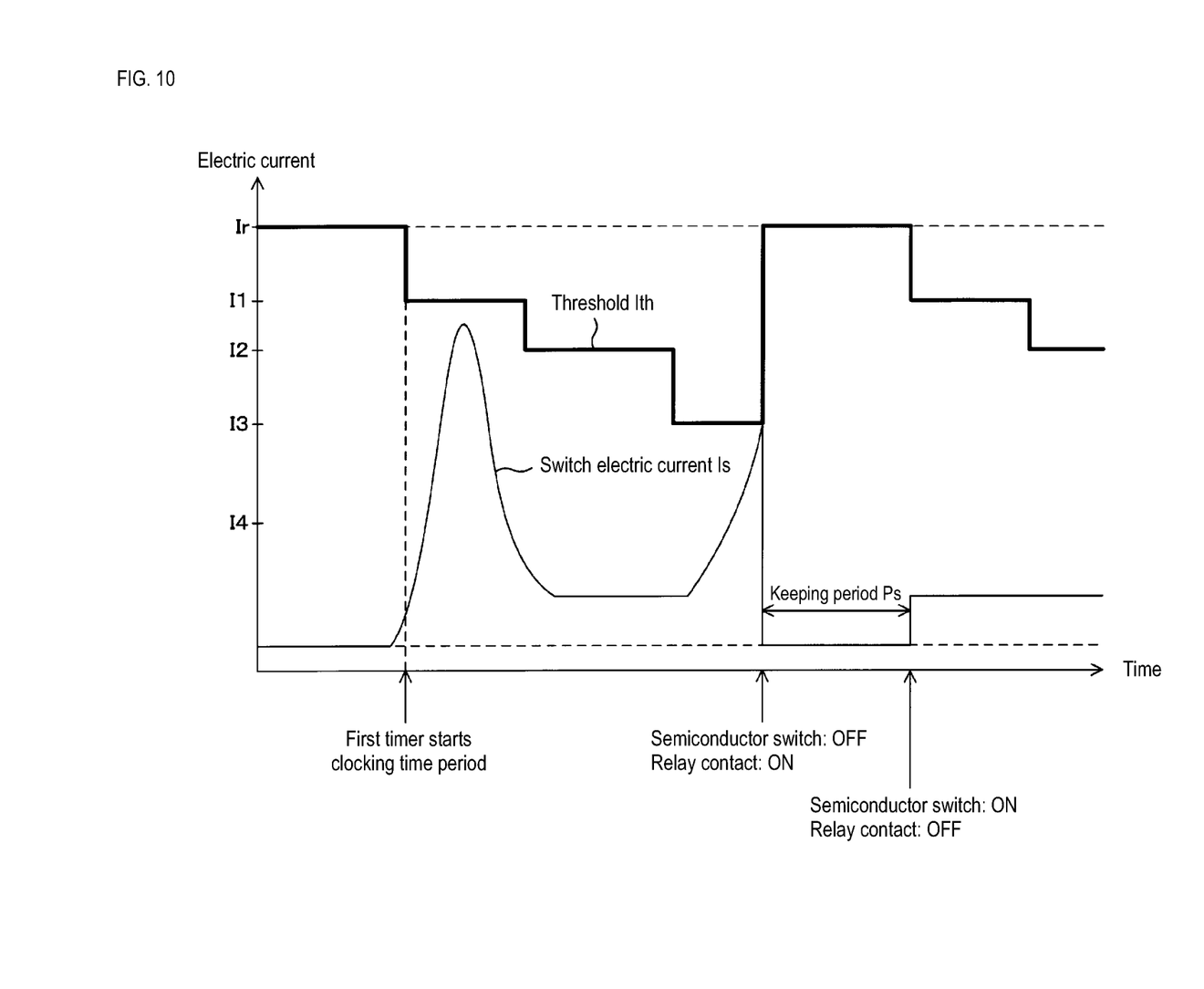
FIG. 10 is a graph showing an example of the change in a switch electric current.

FIG. 10 is a graph showing an example of the change in the switch electric current Is. In FIG. 10, similarly to FIG. 6, the change in the threshold Ith is indicated by a thick line, and the change in the switch electric current Is is indicated by a thin line. The vertical axis represents electric current, and the horizontal axis represents time. As in the description of the change in the threshold Ith with reference to FIG. 6, the threshold Ith is changed in accordance with the lapse of time from when an electric current flows through the semiconductor switches 20a and 20b in the threshold change processing.

It is presumed that the switch electric current Is increases and reaches at least the threshold due to various causes, for example, a temporal contact between a conductor and a lead wire that connects the drain of the semiconductor switch 20b and one end of the load 12. At this time, in the switch change processing, the controller 58 determines that the switch electric current Is is at least the threshold Ith, and the relay contact 30 is switched on and the semiconductor switches 20a and 20b are switched off. Accordingly, the switch electric current Is reaches zero (A), and thus, the threshold Ith indicated by the threshold information is returned to the reference electric current Ir in the threshold change processing.

Also, in the switch change processing, if the controller 58 has determined that the switch electric current Is is at least the threshold Ith, then the controller 58 sets the keeping period Ps. In the example of FIG. 10, the threshold Ith is set to the third electric current I3 when the switch electric current Is is determined to be at least the threshold Ith. Thus, the keeping period Ps indicated by the period information is set to the third period P3 (see FIG. 9).

If the controller 58 has determined that the switch electric current Is is at least the threshold Ith, then the second timer 54 starts clocking a time period. The semiconductor switches 20a and 20b are kept off and the relay contact 30 is kept on from when the controller 58 has determined that the switch electric current Is is at least the threshold Ith to when the keeping period Ps has elapsed, unless the cutoff signal is input to the input unit 55 and the cutoff processing is executed.

If the cutoff processing is executed before the lapse of the keeping period Ps, the semiconductor switches 20a and 20b and the relay contact 30 are switched off in the cutoff processing, and the second timer 54 ends clocking a time period in the switch change processing.

If the keeping period Ps has elapsed, the semiconductor switches 20a and 20b are switched on and the relay contact 30 is switched off in the switch change processing. Accordingly, an electric current flows through the switch circuit 2 again, and in the threshold change processing, the threshold Ith is changed in accordance with the lapse of time from when the electric current flows through the switch circuit 2 again.

If an electric current flows through the switch circuit, the temperature of the switch circuit 2 increases as long as the amount of heat generated by the ON-resistances of the semiconductor switches 20a and 20b exceed the amount of heat released from the semiconductor switches 20a and 20b. The larger the switch electric current Is is, the higher the temperature of the switch circuit 2 is, and the longer the period in which an electric current flows through the switch circuit 2 is, the higher the temperature of the switch circuit 2 is. As shown in FIGS. 6 and 10, in the power supply control device 10, the threshold Ith is changed in accordance with the length of the lapse of time from when an electric current flows through the switch circuit. Specifically, the longer the lapse of time is, the further the threshold Ith decreases. Thus, it is possible to switch on the relay contact 30 and switch off the semiconductor switches 20a and 20b at appropriate timing, for example, at a time when the temperature of the switch circuit 2 approximately coincides with a predetermined temperature.

The keeping period Ps is set in accordance with the threshold Ith used in the determination in step S45 of the connection change processing. Specifically, the larger the threshold Ith used in step S45 is, the longer the keeping period Ps is. Thus, it is possible to switch on the semiconductor switches 20a and 20b and switch off the relay contact 30 in a state in which the temperature of the switch circuit 2 is sufficiently lower than the above-described predetermined temperature.

Because the semiconductor switches 20a and 20b are FETs, parasitic diodes are formed between the drains and the sources of the semiconductor switches 20a and 20b. A cathode and an anode of the parasitic diode are respectively connected to the drain and the source of an N-channel FET. A cathode and an anode of the parasitic diode are respectively connected to the source and the drain of a P-channel FET. As described above, both of the semiconductor switches 20a and 20b are N-channel FETs, and the drain of the semiconductor switch 20a is connected to the drain of the semiconductor switch 20b. Thus, even if the battery 11 is connected incorrectly, no electric current flows through the parasitic diodes formed between the drains and the sources of the semiconductor switches 20a and 20b as long as the semiconductor switches 20a and 20b are off.

Note that the configuration of the switch circuit 2 is not limited to a configuration in which the drain of the semiconductor switch 20a is connected to the drain of the semiconductor switch 20b, and the switch circuit 2 may also have a configuration in which the source of the semiconductor switch 20a is connected to the source of the semiconductor switch 20b, for example. In this case, with regard to the semiconductor switches 20a and 20b, objects to be connected to their drains and sources are exchanged. Furthermore, the semiconductor switches 20a and 20b should be the same type of FET, and thus may also be P-channel FETs. Even with such a configuration described above, no electric current flows through the parasitic diodes formed between the semiconductor switches 20a and 20b as long as the semiconductor switches 20a and 20b are off. If the semiconductor switches 20a and 20b are P-channel FETs, the drive circuit 40 switches on the semiconductor switches 20a and 20b by reducing the voltages at the gates of the semiconductor switches 20a and 20b, and switches off the semiconductor switches 20a and 20b by increasing the voltages at the gates of the semiconductor switches 20a and 20b.

Furthermore, the number of semiconductor switches of the switch circuit 2 is not limited to two, and may also be one. If the number of semiconductor switches of the switch circuit 2 is one, the semiconductor switch is not limited to an FET, and may also be a bipolar transistor, for example. Even with such a configuration, it is possible to switch on the relay contact 30 and switch off the semiconductor switches 20a and 20b at appropriate timing, and to switch on the semiconductor switches 20a and 20b and switch off the relay contact 30 in a state in which the switch circuit 2 has a sufficiently low temperature.

Furthermore, the number of periods that are to be set as the keeping period Ps is not limited to four, and may also be two, three, five, or more. Also, setting the keeping period Ps is not limited to setting using the table shown in FIG. 9. The keeping period Ps may also be set using a computing equation in which the threshold Ith is used as a variable. In this case, in step S48 of the switch change processing, a period is calculated by substituting the threshold Ith indicated by the threshold information into the computing equation, and the keeping period Ps indicated by the period information is set to the calculated period. Furthermore, the keeping period Ps may also be fixed.

Also, except for the reference electric current Ir, the number of electric current values that are set as the threshold Ith is not limited to four, and may also be two, three, five, or more. In this case, the number of time periods to be compared with the first clocking time period, such as the first time period T1 or the second time period T2, is the number obtained by subtracting one from the number of electric current values. Furthermore, the threshold Ith may also be set using a computing equation in which the first clocking time period, that is, the lapse of time from when an electric current flows through the switch circuit 2 is used as a variable. In this case, in the threshold change processing, if the controller 58 has determined that the timer flag value is not zero (step S26: NO), or after executing step S28, the controller 58 calculates an electric current by substituting the first clocking time period into the above-described computing equation, and sets the threshold Ith indicated by the threshold information to the calculated electric current.

Furthermore, the configuration for detecting the switch electric current Is is not limited to the configuration in which the electric current sensor 47 is used, and may also be a configuration in which the switch electric current Is is calculated based on the voltage across both ends of a resistor connected in series with the switch circuit 2, for example. In this case, the relay contact 30 is connected in parallel to a series circuit of the switch circuit 2 and the resistor, and the relay contact 30 is connected substantially in parallel to the switch circuit 2. Also, the load 12 is not limited a load whose resistance gradually increases from when the supply of an electric current is started.

Embodiments that were disclosed are to be considered exemplary in all respects and in no way limiting. The scope of the present disclosure is defined by the scope of the appended claims and not by the above description, and all changes that fall within the same essential spirit as the scope of the claims are included therein.

The invention claimed is:

1. A power supply control device configured to control supply of power via a switch circuit including a semiconductor switch and a relay contact that is connected in parallel to the switch circuit, the power supply control device comprising: a detection unit configured to detect an electric current flowing through the switch circuit; and a determination unit configured to determine whether or not the electric current detected by the detection unit is at least a threshold when the semiconductor switch is on and the relay contact is off; a switching unit configured to, if the determination unit has determined that the electric current is at least the threshold, switch on the relay contact and switch off the semiconductor switch; and a changing unit configured to change the threshold in accordance with a length of a lapse of time from when the electric current flows through the switch circuit.

2. The power supply control device according to claim 1, comprising:
a setting unit configured to, if the determination unit has determined that the electric current is at least the threshold, set a period in accordance with the threshold used by the determination unit in the determination,
wherein if the period set by the setting unit has elapsed after the relay contact is switched on and the semiconductor switch is switched off, the switching unit switches on the semiconductor switch and switches off the relay contact.

3. The power supply control device according to claim 2, wherein the number of semiconductor switches is two,
the two semiconductor switches are FETs,
a source of one of the semiconductor switches is connected to a source of the other of the semiconductor switches, and
the relay contact is connected between drains of the two semiconductor switches.

4. The power supply control device according to claim 1, wherein a number of the semiconductor switches is two, the two semiconductor switches are FETs, a source of one of the semiconductor switches is connected to a source of the other of the semiconductor switches, and the relay contact is connected between drains of the two semiconductor switches.

5. A power supply control method for controlling supply of power via a switch circuit including a semiconductor switch and a relay contact that is connected in parallel to the switch circuit, the method comprising: a step of detecting an electric current flowing through the switch circuit; a step of determining whether or not the electric current detected in the determination unit is at least a threshold when the semiconductor switch is on and the relay contact is off, a step of, if it is determined that the electric current is at least the threshold, switching on the relay contact and switching off the semiconductor switch; and a step of changing the threshold in accordance with a length of a lapse of time from when the electric current flows through the switch circuit.

6. A computer program for causing a computer to control supply of power via a switch circuit including a semiconductor switch and a relay contact that is connected in parallel to the switch circuit, the program causing the computer to execute: a step of acquiring electric current information indicating an electric current flowing through the switch circuit; a step of determining whether or not the electric current indicated by the acquired electric current information is at least a threshold when the semiconductor switch is on and the relay contact is off; a step of, if it is determined that the electric current is at least the threshold, switching on the relay contact and switching off the semiconductor switch; and a step of changing the threshold in accordance with a length of a lapse of time from when the electric current flows through the switch circuit.

* * * * *